United States Patent
Paolucci

(10) Patent No.: US 11,195,655 B2
(45) Date of Patent: Dec. 7, 2021

(54) SEGMENTED WINDING TECHNIQUES FOR A COUPLED INDUCTOR CIRCUIT

(71) Applicant: Analog Devices International Unlimited Company, Limerick (IE)

(72) Inventor: Jonathan Paolucci, San Jose, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/169,338

(22) Filed: Oct. 24, 2018

(65) Prior Publication Data

US 2020/0135390 A1    Apr. 30, 2020

(51) Int. Cl.
*H01F 38/14* (2006.01)
*H01F 27/29* (2006.01)
*H01F 38/02* (2006.01)
*H02M 3/158* (2006.01)

(52) U.S. Cl.
CPC ............. *H01F 38/14* (2013.01); *H01F 27/29* (2013.01); *H01F 38/023* (2013.01); *H02M 3/1582* (2013.01); *H01F 2038/026* (2013.01)

(58) Field of Classification Search
CPC ........ H01F 27/29; H01F 38/14; H01F 38/023; H01F 2038/026; H02M 3/1582
USPC .......................................... 323/247; 336/172
See application file for complete search history.

(56) References Cited

U.S. PATENT DOCUMENTS

| | | | |
|---|---|---|---|
| 4,058,758 A | 11/1977 | Peterson | |
| 6,091,616 A * | 7/2000 | Jacobs | H02M 3/33592 363/127 |
| 7,129,784 B2 | 10/2006 | Bhatti et al. | |
| 7,298,238 B1 * | 11/2007 | Eaton | H01F 21/12 323/255 |
| 7,332,993 B1 | 2/2008 | Nussbaum | |
| 7,576,607 B2 | 8/2009 | Lee et al. | |
| 7,915,989 B2 | 3/2011 | Li et al. | |
| 7,915,991 B2 | 3/2011 | Waffenschmidt et al. | |

(Continued)

FOREIGN PATENT DOCUMENTS

| | | |
|---|---|---|
| CN | 103141021 | 9/2015 |
| CN | 105720824 | 6/2016 |

(Continued)

OTHER PUBLICATIONS

"European Application Serial No. 19202178.0, Extended European Search Report dated Apr. 6, 2020", 11 pgs.

(Continued)

*Primary Examiner* — Shawki S Ismail
*Assistant Examiner* — Monica Mata
(74) *Attorney, Agent, or Firm* — Schwegman Lundberg & Woessner, P.A.

(57) ABSTRACT

Techniques are provided for segmented windings of a coupled inductor within a DC-DC voltage converter or regulator. In an example, a coupled inductor circuit can include a first winding comprising a conductive coil having a central axis, and a second winding configured to magnetically couple with the first winding. The second winding can have a plurality of individual segments. Each individual segment can form a fraction of one turn of the second winding. Each segment can include a first conductor, a ground conductor, and a first switch to selectively couple, and selectively isolate, the first conductor and the ground conductor.

20 Claims, 6 Drawing Sheets

(56) References Cited

U.S. PATENT DOCUMENTS

| | | | |
|---|---|---|---|
| 7,940,152 | B1 | 5/2011 | Kim et al. |
| 7,944,296 | B1 | 5/2011 | Lee et al. |
| 8,044,732 | B2 | 10/2011 | Kossel et al. |
| 8,725,085 | B2 | 5/2014 | Darabi et al. |
| 8,842,410 | B2 | 9/2014 | Chan |
| 9,379,629 | B2 | 6/2016 | Chandrasekaran |
| 2004/0017276 | A1 | 1/2004 | Chen et al. |
| 2006/0066431 | A1 | 3/2006 | Anand et al. |
| 2006/0197510 | A1 | 9/2006 | Chandrasekaran |
| 2007/0103941 | A1* | 5/2007 | Liu .............. H02M 3/158 363/16 |
| 2009/0010971 | A1 | 4/2009 | Nakahori |
| 2011/0215865 | A1 | 9/2011 | Nam et al. |
| 2014/0153294 | A1 | 6/2014 | Deboy et al. |
| 2017/0085183 | A1 | 3/2017 | Notsch |
| 2017/0271073 | A1 | 9/2017 | Zeng et al. |
| 2017/0310228 | A1 | 10/2017 | Nakajima et al. |
| 2019/0229633 | A1* | 7/2019 | Perreault .............. H01F 27/2804 |

FOREIGN PATENT DOCUMENTS

| | | |
|---|---|---|
| CN | 111091957 | 5/2020 |
| EP | 0050432 | 4/1982 |
| EP | 0302162 | 2/1989 |
| GB | 2445677 | 7/2008 |
| JP | 4149915 | 7/2008 |
| TW | I220994 | 9/2004 |
| TW | 202017297 | 5/2020 |
| WO | 2013107782 | 7/2013 |
| WO | 2018160962 | 9/2018 |

OTHER PUBLICATIONS

"Korean Application Serial No. 10-2019-0132039, Office Action dated Jan. 11, 2021", w/ English Translation, 18 pgs.

"European Application Serial No. 19202178.0, Communication Pursuant to Article 94(3) EPC dated Nov. 23, 2020", 6 pgs.

"European Application Serial No. 19202178.0, Response filed Mar. 17, 2021 to Communication Pursuant to Article 94(3) EPC dated Nov. 23, 2020", 12 pgs.

"European Application Serial No. 19202178.0, Response filed Oct. 23, 2020 to Extended European Search Report dated Apr. 6, 2020", 18 pgs.

"Korean Application Serial No. 10-2019-0132039, Response filed Mar. 10, 2021 to Office Action dated Jan. 11, 2021", w/ English claims, 22 pgs.

"International Application Serial No. PCT/EP2021/059499, International Search Report dated Jul. 30, 2021", 5 pgs.

"International Application Serial No. PCT/EP2021/059499, Written Opinion dated Jul. 30, 2021", 10 pgs.

* cited by examiner

SEGMENTED WINDING TECHNIQUES FOR A COUPLED INDUCTOR CIRCUIT

TECHNICAL FIELD

This application provides techniques for coupled inductor circuits for DC-DC voltage converters or regulators.

BACKGROUND

DC-DC switching regulators, as the name applies, use high-frequency switching to generate a desired output voltage for an electronic device. In certain applications, the demand for low voltage electronics to accept relatively high supply voltages creates design challenges for stepping down the supply voltage to a low supply voltage. The same, or very similar, design challenges can also be found in step-up applications where a high supply voltage is converted from a low input supply voltage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
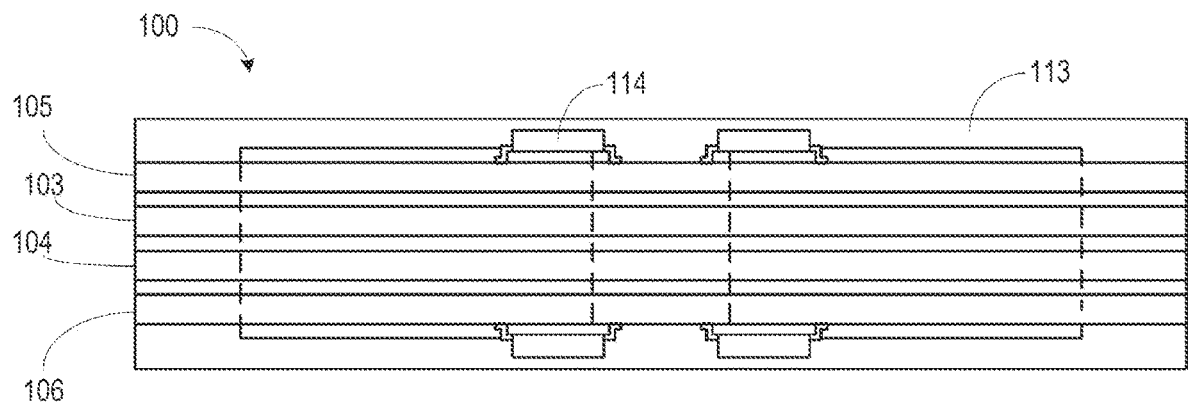
FIG. 1A illustrates generally an exploded view of a planar coupled inductor circuit including windings with multiple segments.

The present inventor(s) have recognized techniques for planar transformers, or planar coupled inductor circuits, that can employ segmented windings to reduce the size, and possibly, the complexity of certain step-down and step-up transformers for DC-to-DC voltage converters compared to conventional techniques. FIG. 1A illustrates generally an exploded view of a planar coupled inductor circuit 100 including windings 101, 102 with multiple segments. In certain examples, the coupled inductor circuit 100 can include two windings 101, 102 with a first winding 101 occupying one or more internal substrate layers 103, 104 of the planar coupled inductor circuit 100 and a second winding 102 occupying one or more substrate layers 105, 106 adjacent to, or sandwiching, the substrate layers of the first winding 101. In the example of FIG. 1A, a first winding 101 can occupy a first layer 103 and a second layer 104 of the substrate, and a second winding 102 can occupy a third layer 105 and a fourth layer 106 of the substrate. The first and second layers 103, 104 of the substrate can be positioned between the third and fourth layers 105, 106 of the substrate. One or more of the layers can include vias 107 to allow for electrical connections between the layers of the substrate.

Figure 1B:
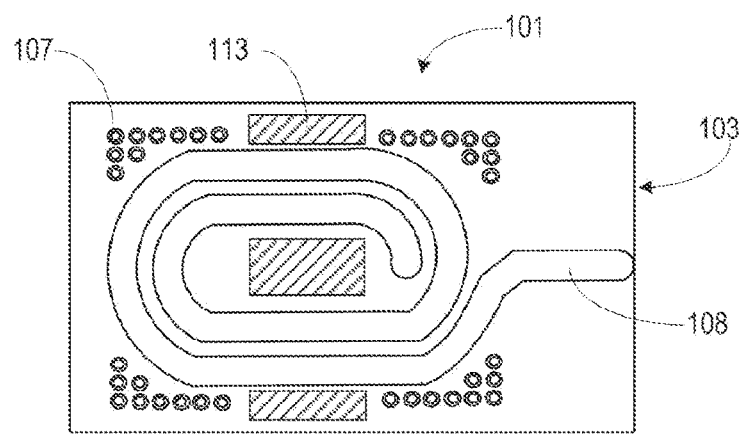
FIG. 1B illustrates generally an example layout of one of the substrate layers including a portion of the first winding of the device of FIG. 1A.

FIG. 1B illustrates generally an example layout of one of the substrate layers 103, 104 including a portion of the first winding 101 of the device of FIG. 1A. The layout can include a single trace 108 on or integrated with the substrate and having a path that provides two turns about a central axis. In certain examples, the trace 108 can be coupled to switches (not shown) that alternate polarity of the connection of the first winding 101 to other devices such as a supply voltage, for example. In addition to the trace 108, the layer can include vias 107 for accommodating interconnections between the substrate layers of the coupled inductor circuit 100.

Figure 1C:
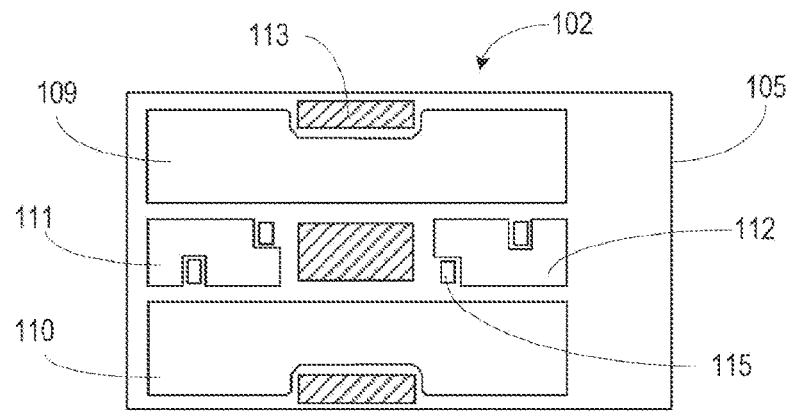
FIG. 1C illustrates generally an example layout of one of the substrate layers including a portion of the second winding of the coupled inductor circuit of FIG. 1A.

FIG. 1C illustrates generally an example layout of one of the substrate layers 105, 106 including a portion of the second winding 102 of the coupled inductor circuit 100 of FIG. 1A. The layout can include a first segment trace 109, a second segment trace 110, a first reference plane trace 111, and a second reference plane trace 112. In certain examples, windows of a magnetic core 113 can be positioned such that the segment traces 109, 110 pass through a window. In certain examples, the segment traces 109, 110 and the reference plane traces 111, 112 can accommodate a transistor circuit 114 to be coupled between an end of a segment trace and an adjacent reference plane trace. In certain examples, the layout can include a termination pads 115 for control signals to each of the transistor circuits.

As illustrated, the example of FIG. 1A can include a first winding 101 with 4 turns around an axis of the magnetic core 113 and a second winding 102 with an apparent two turns around the axis of the magnetic core 113 and with each turn including two segments. However, as will be explain below, the number of actual turns each winding makes about the core can depend on how the terminations of each substrate layer are interconnected with corresponding layers of the corresponding winding.

Figure 2:
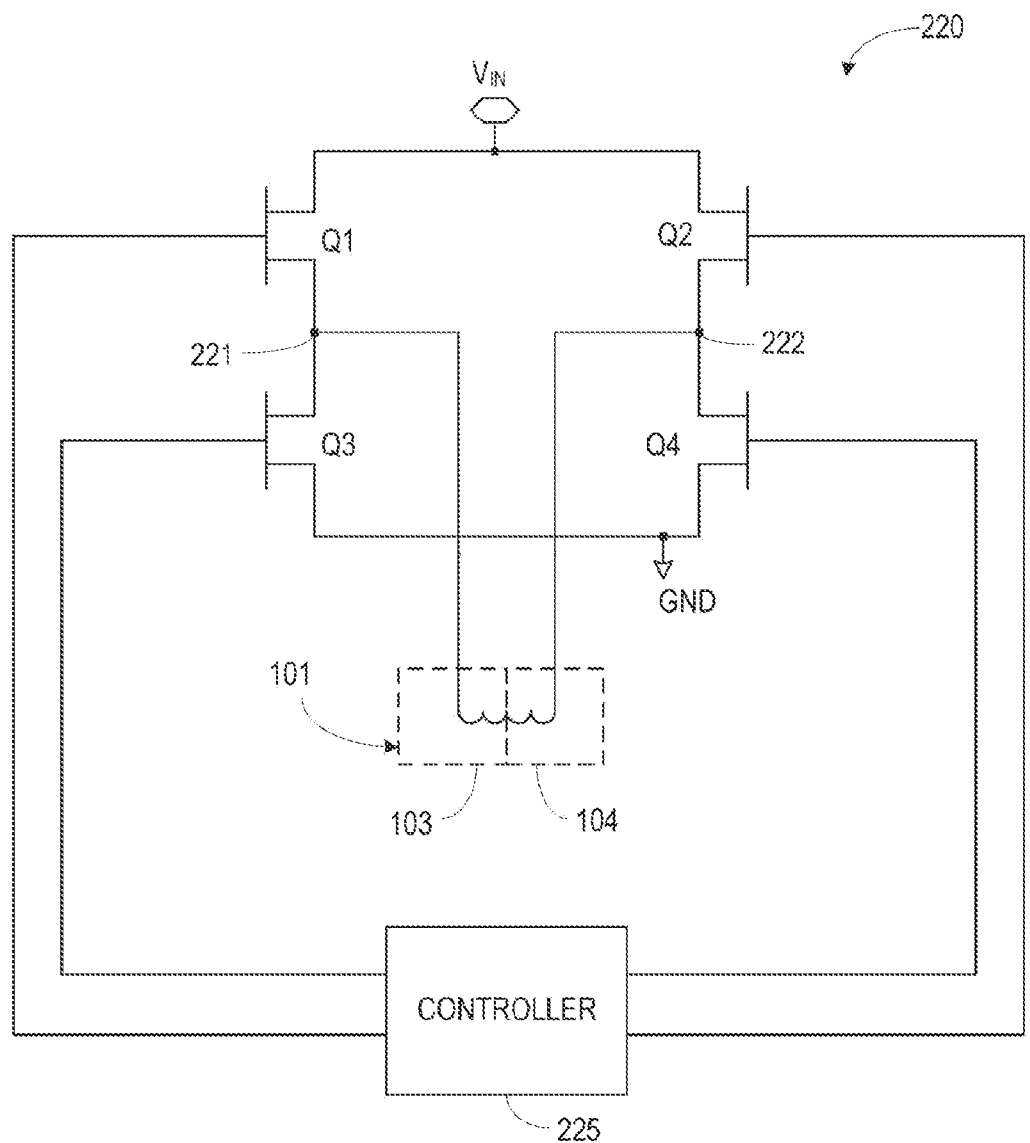
FIG. 2 illustrates generally an example first winding circuit for the coupled inductor circuit of FIG. 1A.

FIG. 2 illustrates generally an example first winding circuit 220 for the coupled inductor circuit 100 of FIG. 1A. The description explains the first winding circuit 220 in terms associated with a primary winding of a transformer although, in other examples, it is not so limited. In certain examples, the first winding circuit 220 can include the first winding 101, and four switches (Q1, Q2, Q3, Q4). As discussed above, the first winding 101 can be fabricated on two substrate layers 103, 104 with the trace of the first substrate layer 103 connected in series with the trace of the second substrate layer 104. The four switches (Q1, Q2, Q3, Q4) can couple one of the terminal ends 221, 222 of the first winding 101 to a voltage ($V_{IN}$, GND) of a voltage supply. It is understood that, in certain examples, a first winding can include more or less turns than discussed above on more or less substrate layers than discussed above without departing from the scope of the present subject matter.

In certain examples, the coupled inductor circuit 100 can include a controller 225 mounted within or on the substrate. In some examples, the controller 225 can be remote from the coupled inductor circuit 100. For the present example, the primary winding circuit 220 can have 3 states of operation. A first state, a free-wheeling state, can have a first switch (Q1) and a second switch (Q2) "OFF" or in a high impedance state, and a third switch (Q3) and a fourth switch (Q4) "ON", or in a low impedance state. In the first, free-wheeling state, the terminal ends 221, 222 of the first winding 101 can be isolated from a DC supply voltage and can be coupled to a reference voltage such as ground (GND). Such connection can terminate current passing through the first winding 101. In certain examples, just before, and just after, the supply voltage ($V_{IN}$) is applied across the first winding, all the switches (Q1, Q2, Q3, Q4) can be placed in a high-impedance state for a short interval to prevent shorting the supply voltage ($V_{IN}$) to ground due to, for example, a longer inherent delay of one of the switches (Q1, Q2, Q3, Q4) compared to another.

The second state and the third state of the first winding circuit 220, or at least the transition to each such state, can be power generating states of the coupled inductor circuit 100. In the second state, the second switch (Q2) and the third switch (Q3) can be "ON", and the first switch (Q1) and the fourth switch (Q4) can be "OFF". The second state can provide a DC voltage (Vd) across the first winding 101 with a first terminal end 221 of the first winding 101 more positive than the second terminal end 222 of the first winding 101. In the third state, the first switch (Q1) and the fourth switch (Q4) can be "ON", and the second switch (Q2) and the third switch (Q3) can be "OFF". The third state can again provide the DC voltage (Vd) across the first winding 101, but with the first terminal end 221 of the first winding 101 more negative than the second terminal end 222 of the first winding 101. Therefore, the difference between the second and third states of operation of the first winding circuit 220 is the polarity of the supply voltage (Vd) coupled to the first winding 101.

Figure 3:
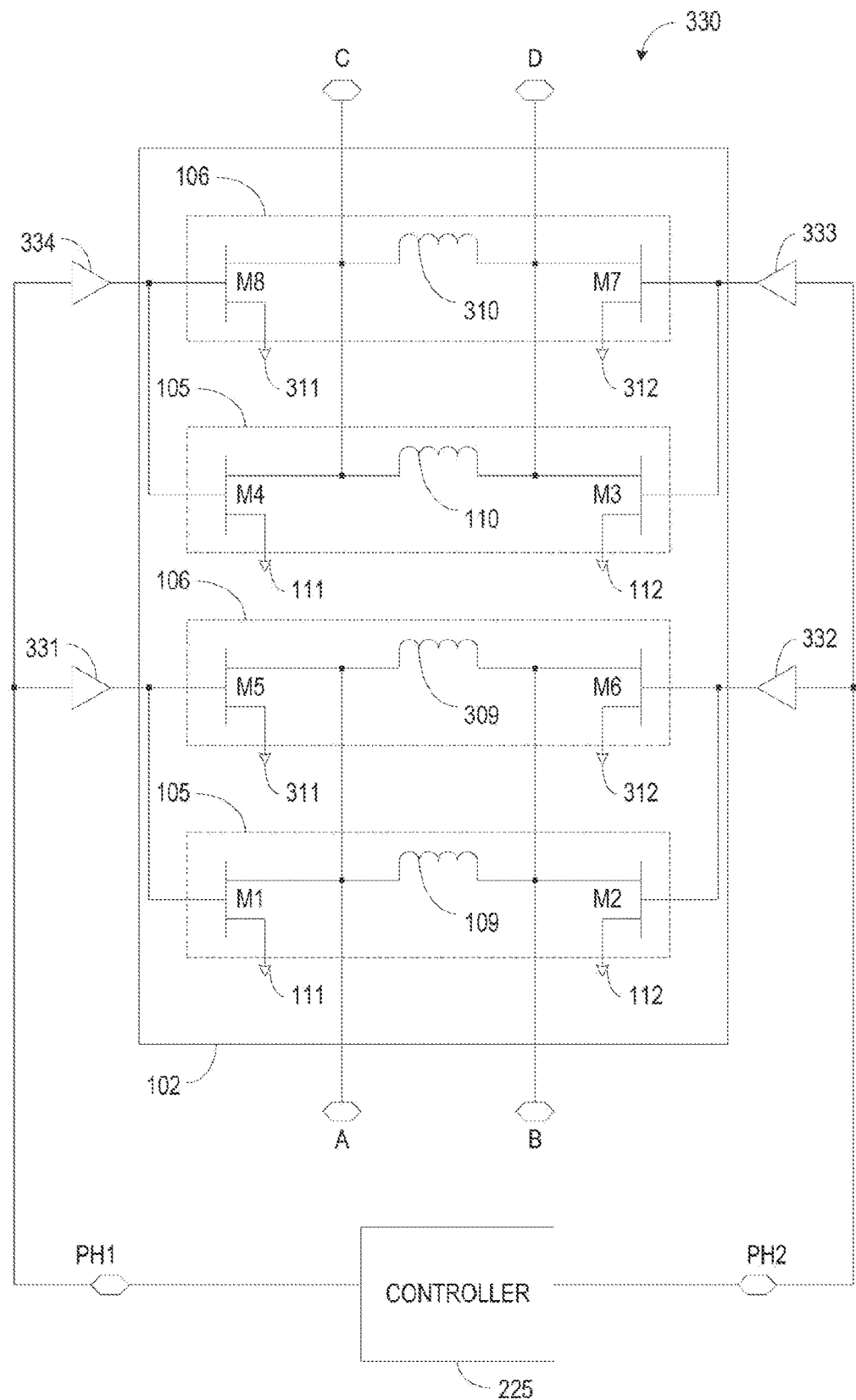
FIG. 3 illustrates general an example second winding circuit for the example coupled inductor circuit of FIG. 1.

FIG. 3 illustrates general an example second winding circuit 330 for the example coupled inductor circuit 100 of FIG. 1. The description explains the second winding circuit 330 in terms associated with a secondary winding of a step-down transformer although it is not limited as such. In certain examples, the second winding circuit 330 can include each segment 109, 110, 309, 310, or segment trace, of the second winding 102, each reference plane trace 111, 112, 311, 312, a plurality of switches (M1-M8), and drivers 331, 332, 333, 334 for the switches (M1-M8). Each switch can couple and isolate each end of each segment trace with a reference plane trace. In certain examples, an individual driver can be coupled to each individual switch. In some examples, as shown in FIG. 3, it may be possible to drive more than one switch with a single driver. The second winding 102, can be distributed between multiple layers of the coupled inductor circuit substrate, such as the third layer 105 and the fourth layer 106 as discussed above with respect to FIG. 1A.

In certain examples, some segments of the second winding 102 can be electrically coupled. For example, in the illustrated example, each segment trace 109, 110 in the third layer 105 can be electrically connected in parallel to a corresponding segment trace 309, 310 in the fourth layer 106. With the parallel connections of the segments, or segment traces, of the second winding 102, the coupled inductor circuit 100 can provide a step down of the voltage applied to the first winding 101 by a factor of 8.

In general, the voltage ratio ($V_1/V_2$) between the first winding voltage and the second winding voltage can be given by:

$$\frac{V_1}{V_2} = N \times N_s,$$

where V1 is the voltage at the terminal ends of the first winding, V2 is the voltage at the terminal ends of the second winding, N is the turns ratio and Ns is the number of segments per turn of the segmented second winding. For the illustrated coupled inductor circuit and layers of FIGS. 1A-1C, the turns ratio (N) is 4 and the number of segment per turn (Ns) is 2, therefore, the voltage ratio is 8, such that $V_2=V_1/8$. Note that although the second winding includes a combination of traces (FIG. 1C; 109, 110, 111, 112) that can circle the core twice (via layers 105, 106), the parallel connection of the segment pairs creates a single effective turn for the second winding 102.

In certain examples, the coupled inductor circuit can include an output stage coupled to drains of the switches that can provide an output DC voltage. In an example, the output stage can include an individual inductor having one node coupled to a corresponding output node (A, B, C, D) of the second winding 102. The other node of each inductor can be coupled to the other node of the other inductors to provide an output node for providing the output DC voltage.

Figure 4:
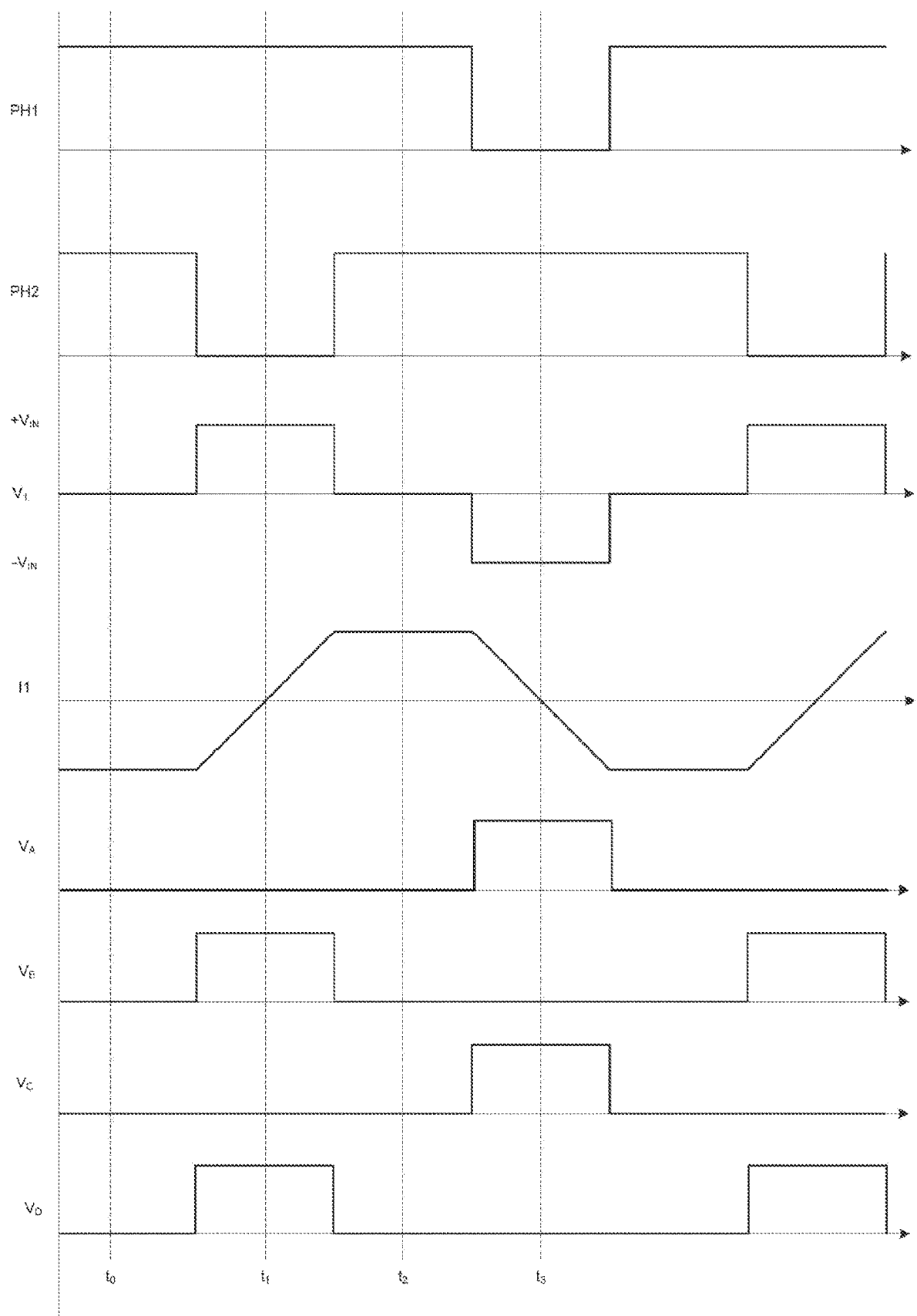
FIG. 4 illustrates generally a plot of the control signal for the first and second winding switches for the coupled inductor circuit of FIGS. 1A-IC and the circuits of FIGS. 2 and 3.

FIG. 4 illustrates generally a plot of the control signal for the first and second winding switches for the coupled inductor circuit of FIGS. 1A-1C and the circuits of FIGS. 2 and 3. The plots include the logic level of the phase 1 (PH1) and phase 2 (PH2) signals controlling the switches of the second winding, the voltage ($V_1$) across the first winding, the current (I1) in the first winding, and the voltages ($V_A$, $V_B$, $V_C$, $V_D$) at the output nodes (A,B,C,D) of the second winding In general, the winding segments of the second winding are placed in one of three phases to capture a voltage induced by the first winding during the transitions associated with the supply voltage being applied to, or isolated from the first winding. When the supply voltage is applied to, or isolated from, the first winding, the change in current through the first winding can induce a voltage across each second winding segment. By switching the connections of the second winding segments to capture the voltage induced as current polarity of the first winding is changed, a stepped-down DC voltage can be captured at the terminal ends, or output nodes (A, B, C, D), of the second winding. The plot of signals assumes that a logic high places each switch, or transistor, in a low impedance state (e.g., "on") and a logic low places each switch in a high impedance state (e.g., "off"). However, it is understood that switches or transistors responding to logic commands differently are possible and do not depart form the scope of the present subject matter.

For example, at to, the first winding circuit is in the first, free-wheeling state and the second winding circuit has all the switches (M1-M8) "on" (e.g., PH1=PH2="high"), thus, coupling each node of the segments to ground. The free-wheeling state of the first winding allows any current in the first winding to continue to flow until terminated by the circuit losses. As the switching of the system is relatively fast, there is generally little of any change in current during the free-wheeling state. Since there is little change in current flow of the first winding, no voltage is induced by the first winding in the segments of the second winding.

At $t_1$, the first winding circuit moves to the second state, and a supply voltage can be applied across the first winding with a first polarity (+$V_{IN}$). The application of the supply voltage ($V_{IN}$) can induce a change in current (I1) of the first winding and a voltage can be induced across segments of the second winding. For example, at or in response to the application of the supply voltage (+$V_{IN}$) on the first winding, the switches (FIG. 3; M2, M3, M6, M7) associated with the phase 2 control signal (PH2) can be turned "off". The change in current (I1) of first winding can induce a voltage at the drains (B, D) of the switches (FIG. 3; M2, M3, M6, M7) associated with the phase 2 control signal (PH2). The magnetic coupling of the planar first and second windings can be quite good such that the induced voltage ($V_B$, $V_D$) of the segments of the second winding can match the sharp, pulse shape of the supply voltage ($V_{IN}$) applied to the first winding. Output filters coupled to the drains (A, B, C, D) of the switches can provide a smooth DC output voltage. In certain examples, the output filters can include output filter inductors.

At $t_2$, the first winding circuit transitions back to the first, free-wheeling state and the second winding circuit has all the switches (M1-M8) "on" (e.g., PH1=PH2="high"), thus, coupling each node of the second winding segments to ground. As before, any current flowing in the first winding continues to flow because the first winding inductance resists a change in current flow. The current may fall slightly during the free-wheeling state due to losses in the circuit, however, for purposes of this disclosure, the losses are negligible due to the high switching frequency of the system.

At $t_3$, the first winding circuit moves to the third state, and the supply voltage ($V_{IN}$) can be applied across the first winding with a second polarity (-$V_{IN}$). The application of the supply voltage ($V_{IN}$) can induce a change in current (I1) of the first winding and voltage can be induced across segments of the second winding. For example, at or in response to the application of the supply voltage (-$V_{IN}$) on the first winding, the switches (FIG. 3; M1, M4, M5, M8) associated with the phase 1 control signal (PH1) can be turned "off". The change in current (I1) of first winding can induce a voltage at the drains (A, C) of the switches (FIG. 3; M1, M4, M5, M8) associated with the phase 1 control signal (PH1). The magnetic coupling of the planar first and second windings can be quite good such that the induced voltage ($V_A$, $V_C$) of the segments of the second winding can match the sharp, pulse shape of the supply voltage ($V_{IN}$) applied to the first winding.

Figure 5A:
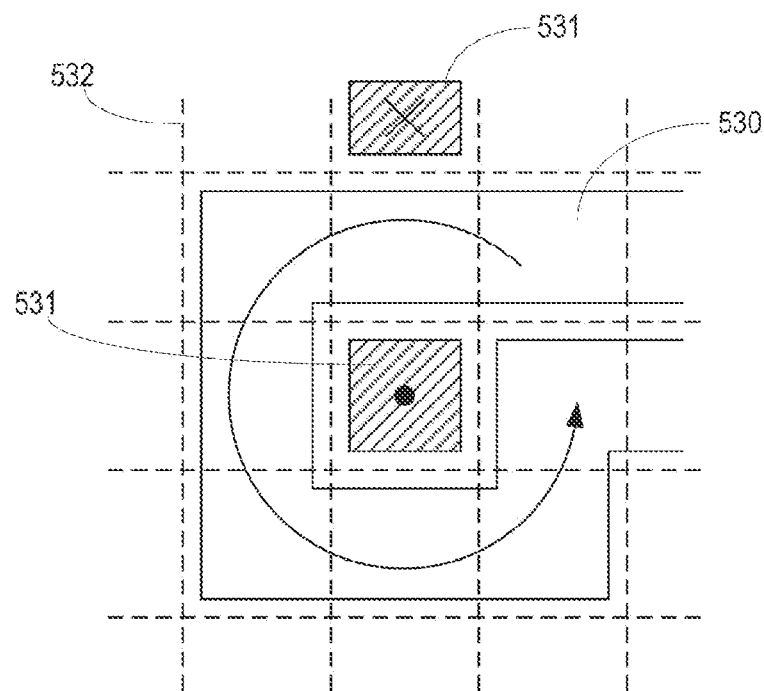
FIG. 5A illustrates a single turn of a second winding having four turns.

In certain examples, a coupled inductor circuit that employs a winding with segmented turns can benefit over conventional transformers as the resistance of the winding with the fractional turns can be less that the resistance of a traditional winding. FIG. 5A illustrates a single turn of a second winding having four turns.

Figure 5B:
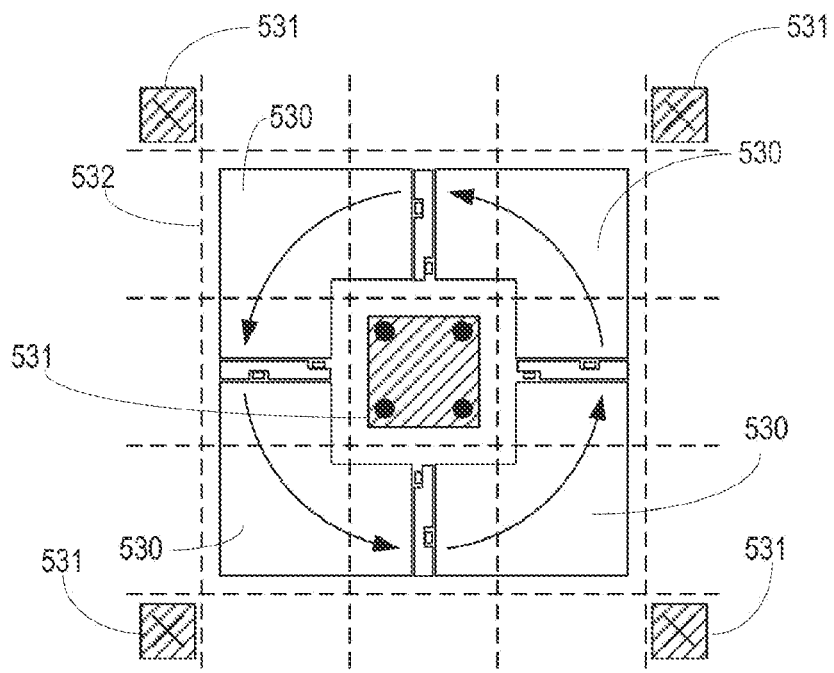
FIG. 5B illustrates an example second winding having four segments.

FIG. 5B illustrates an example second winding having four segments. Each example of FIGS. 5A and 5B includes a conductive portion 530 of the winding or turn and a cross section of a magnetic core 531 of the coupled inductor circuit that includes each winding. Each segment or turn can contribute a factor of four to a transformer turn ratio. For example, if each second winding, of FIGS. 5A and 5B, is used as a secondary winding, each turn or segment can be connected to contribute a ¼ step-down factor. Each winding, or portion thereof, of FIGS. 5A and 5B is illustrated on a grid 532. For illustrative purposes, the resistance of each winding is 1 unit per gridline distance. For the full winding of FIG. 5A, the path of each turn traverses 8 gridline distances. Thus, the total resistance for the full 4-turn winding of FIG. 5A is, 8 units/turn*4 turns=32 units.

For the example second winding of FIG. 5B, each segment traverses 2 gridline distances. Thus, the total resistance for the example winding is, 2 units/segment*4 segments=8 units.

The reduced winding resistance of the example segmented second winding of FIG. 5B can result in a more efficient coupled inductor circuit as less energy is dissipated as resistive heat in the example segmented second winding of FIG. 5B for a similar amount of current as compared to the traditional second winding of FIG. 5A.

Figure 6:
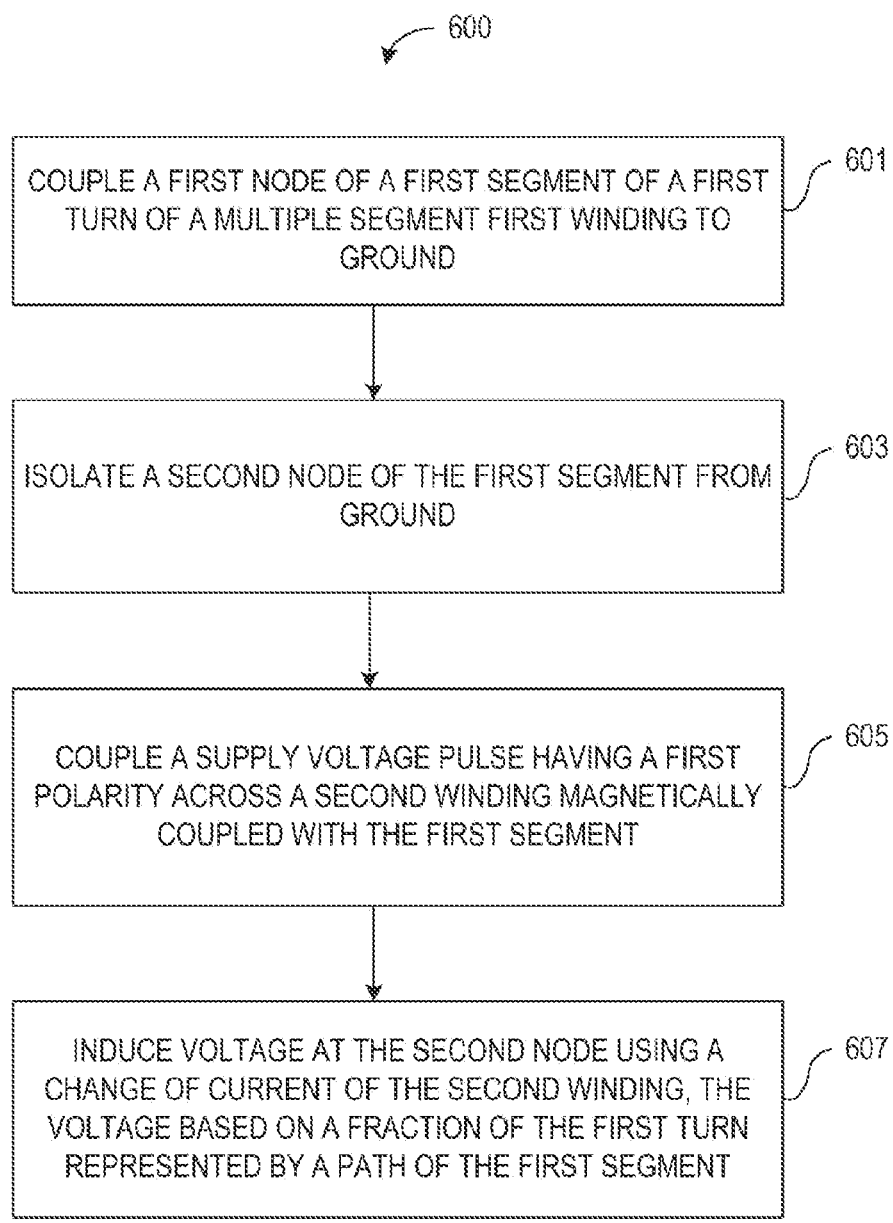
FIG. 6 illustrates generally a flowchart of an example method of operating a coupled inductor circuit with a segmented winding.

FIG. 6 illustrates generally a flowchart of an example method 600 of operating a coupled inductor circuit with a segmented winding. At 601, a first node of a first segment of a segmented winding can be electrically coupled to ground. In certain examples, a transistor can couple the first node to ground, such as a ground plate in the path of a turn of the segmented winding. At 603, a second node of the first segment can be electrically isolated from ground. In certain examples, a second transistor can be used to isolate the second node from, for example, a second ground plate in the path of the turn of the segmented winding. At 605, a supply voltage having a first polarity can be coupled across end nodes of a second winding that is magnetically coupled with the segmented winding. The supply voltage can be coupled to the second winding for a predetermined interval to apply a voltage pulse to the second winding. In certain examples, the windings can be planar windings fabricated in layers, stacked, and arranged to have a metal core intersect the windings to assist in magnetically coupling the windings. At 607, the changing current because of the application of the supply voltage can induce a voltage at the second node of the segment. In certain examples, one or more second segments of the segmented winding can be coupled in parallel with the first segment and can be arranged such that the voltage is reinforced at the second node via the second segments. In certain examples, the induced voltage can be based on the fraction of one turn, of the segmented winding, is represented by the path of the first segment.

A second phase of the method can couple the second node of the first segment to ground, isolate the first node of the first segment from ground, apply the supply voltage with opposite polarity to the second winding, and induce the voltage at the first node using the current change of the second winding. Between phases, the method can include electrically coupling the ends of the second winding together such that current flow in the second winding is maintained, and can include coupling each node of each segment of the segmented winding to a ground plate.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A coupled inductor circuit comprising:
   a ground conductor;
   a first winding circuit comprising a conductive coil having a central axis; and
   a second winding circuit configured to magnetically couple with the first winding circuit, the second winding circuit comprising:
      a plurality of individual segments, wherein each individual segment of the plurality of individual segments comprises a first conductive portion that forms a fraction of one turn of a winding; and
      respective first switches corresponding to each individual segment of the plurality of individual segments of the winding, wherein each first switch is configured to selectively couple, and selectively isolate, the first conductive portion of the corresponding individual segment and the ground conductor; and
   an output stage comprising respective output filters for each individual segment of the plurality of individual segments of the winding, and the output stage is configured to provide a DC output voltage at an output node;
   wherein the respective output filters are coupled between the first conductive portion of the corresponding individual segment and the output node of the output stage.

2. The coupled inductor circuit of claim 1, further comprising respective second switches configured to selectively couple, and selectively isolate, the first conductive portion of the corresponding segment and a second ground conductor, wherein the second ground conductor is the ground conductor of a different individual segment of the plurality of individual segments of the second winding circuit.

3. The coupled inductor circuit of claim 1, wherein the plurality of individual segments of the second winding circuit comprise planar windings.

4. The coupled inductor circuit of claim 1, wherein the first winding, circuit includes N coils around the central axis; and
   wherein the winding of the second winding circuit includes m coils around the central axis;
   wherein the winding of the second winding circuit includes x segments, of the plurality of individual segments, in each of the m coils; and
   wherein a ratio of an input voltage (Vin), selectively coupled to the first winding circuit, and an output voltage (Vout) induced on each segment of the second winding is given by:

$$Vin/Vout = N*m.$$

5. The coupled inductor circuit of claim 1, wherein the output filters include respective inductors, wherein each of the inductors includes a first inductor terminal coupled to the first conductive portion of the corresponding individual segment and a second inductor terminal coupled to the output node.

6. The coupled inductor circuit of claim 1, including a metal core.

7. The coupled inductor circuit of claim 6, wherein the metal core includes a number of openings; and
   wherein the plurality of individual segments of the second winding circuit pass through an opening of the number of openings of the metal core.

8. The coupled inductor circuit of claim 1, including a controller circuit configured to selectively couple a direct current supply to the conductive coil of the first winding circuit to induce current in the second winding circuit, and to control the switches corresponding to the individual segments of the second winding circuit to provide the DC output voltage.

9. The coupled inductor circuit of claim 8, wherein the controller circuit is configured to:
   during a first stage, couple a first node of each first conductive portion of the corresponding individual segment of the plurality of individual segments of the second winding circuit to the ground conductor;

during the first stage, isolate a second node of each first conductive portion of the corresponding individual segment of the plurality of individual segments of the second winding circuit from the ground conductor; and during the first stage, apply an input voltage to the first winding circuit with a first polarity.

10. The coupled inductor circuit of claim 9, wherein the controller is configured to:

during a second stage, couple the second node of each first conductive portion of the corresponding individual segment of the plurality of individual segments of the second winding circuit to a ground conductor of an adjacent segment;

during the second stage, isolate the first node of each first conductive portion of the corresponding individual segment of the plurality of individual segments of the second winding circuit from the ground conductor; and during the second stage, apply the input voltage to the first winding circuit with a second polarity opposite the first polarity.

11. The coupled inductor circuit of claim 1, wherein the first winding circuit comprises a planar winding.

12. The coupled inductor circuit of claim 11, including a multiple layer substrate;

wherein one or more first layers of the multiple layer substrate includes the conductive coil of the first winding circuit; and wherein one or more second layers of the multiple layer substrate include the plurality of individual segments of the second winding circuit.

13. The coupled inductor circuit of claim 12, wherein the one or more first layers are positioned between two layers of the one or more second layers.

14. A method of controlling a DC-DC coupled inductor circuit, the method comprising:

electrically coupling a first end of a first conductor segment of a first turn of a first winding to ground, the first conductor segment coupled in parallel with a second conductor segment of the first turn of the first winding, the first winding including one or more turns, each turn including multiple conductor segments to form each turn, the one or more turns including the first turn;

electrically isolating a second end of the first conductor segment from ground;

electrically coupling a supply voltage (VIN) across a second winding with a first polarity, the second winding magnetically coupled to the first conductor segment;

inducing an output voltage at the second end using a change of current of the second winding, the output voltage based on a fraction of the first turn represented by a path of the first conductor segment; and using the output voltage at the second end of the first conductor segment, providing a smoothed DC output signal using an inductive output filter.

15. The method of claim 14, including, after a first delay, isolating the first end of the first conductor segment from ground; and isolating the supply voltage from the second winding.

16. The method of claim 15, including, after a second delay, isolating the second end of the first conductor segment of the first turn of the first winding from ground;

coupling the first end of the first conductor segment with ground;

coupling the supply voltage to the second winding with a second polarity; and inducing the output voltage at the second end using a change of current of the second winding, the output voltage based on a fraction of the first turn represented by a path of the first conductor segment.

17. The method of claim 16, including after a third delay, coupling the second end of the first conductor segment with ground; and electrically isolating the supply voltage from the second winding.

18. The method of claim 17, wherein the coupling the first end of the first conductor segment with ground includes coupling a first end of the second conductor segment of the first winding to ground.

19. The method of claim 18, wherein the second conductor segment is a second conductor segment of the first turn of the first winding and is selectively coupled to the first conductor segment.

20. The method of claim 18, wherein the second conductor segment includes a plurality of conductor segments directly coupled in parallel with the first conductor segment.

* * * * *